US012168390B2

(12) United States Patent
Mannheim Astete et al.

(10) Patent No.: US 12,168,390 B2
(45) Date of Patent: Dec. 17, 2024

(54) MULTIPLE CIRCUIT VARIABLE LIGHT TRANSMISSION GLAZING SYSTEM

(71) Applicant: AGP America S.A., Ciudad de Panama (PA)

(72) Inventors: Mario Arturo Mannheim Astete, Lima (PE); Jose Roman Carrillo Rojas, Lima (PE); Ian Jarm Riofrio Véliz, Lima (PE)

(73) Assignee: AGP America S.A., Panama (PA)

( * ) Notice: Subject to any disclaimer, the term of this patent is extended or adjusted under 35 U.S.C. 154(b) by 0 days.

(21) Appl. No.: 17/665,519

(22) Filed: Feb. 5, 2022

(65) Prior Publication Data

US 2022/0250448 A1 Aug. 11, 2022

Related U.S. Application Data

(60) Provisional application No. 63/146,597, filed on Feb. 6, 2021, provisional application No. 63/146,234, filed on Feb. 5, 2021.

(51) Int. Cl.
*B60J 1/20* (2006.01)
*B60J 3/04* (2006.01)
*E06B 9/24* (2006.01)
*G02F 1/1334* (2006.01)
*G02F 1/17* (2019.01)

(52) U.S. Cl.
CPC . *B60J 1/20* (2013.01); *B60J 3/04* (2013.01); *E06B 9/24* (2013.01); *E06B 2009/2464* (2013.01); *G02F 1/1334* (2013.01); *G02F 1/172* (2013.01)

(58) Field of Classification Search
CPC . G02F 1/1334; G02F 1/172; B60J 1/20; B60J 3/04; E06B 9/24; E06B 2009/2464
See application file for complete search history.

(56) References Cited

U.S. PATENT DOCUMENTS

| 2005/0041020 | A1* | 2/2005 | Roes | G02F 1/133382 345/211 |
|---|---|---|---|---|
| 2010/0315693 | A1* | 12/2010 | Lam | G02F 1/0018 359/275 |
| 2015/0367782 | A1* | 12/2015 | Mannheim Astete | G02F 1/1333 349/12 |
| 2017/0297310 | A1* | 10/2017 | Mannheim Astete | E06B 3/66304 |

(Continued)

*Primary Examiner* — Jia X Pan
(74) *Attorney, Agent, or Firm* — The Morales Law Firm; Joseph L. Morales, Esq.

(57) ABSTRACT

The demand for automotive glazings, on which the intensity of the light transmitted can be controlled by the user, has been increasing as the public becomes more aware of the technology. The most common methods employed to make such glazings utilize Suspended Particle Devices (SPD) and Polymer Dispersed Liquid Crystal (PDLC) films. With both, the light transmission of the glazing changes in response to an alternating current electrical field. A problem with this technology is that the voltage required is far higher than that of the typical automotive electrical system. The disclosure provides a touch potential safe, small, lightweight and inexpensive means for controlling the light transmission of multiple glazing circuits by combining a single flyback voltage converter with multiple variable amplitude sinewave generators all coordinated by a micro-controller.

9 Claims, 3 Drawing Sheets

(56) References Cited

U.S. PATENT DOCUMENTS

| | | | | |
|---|---|---|---|---|
| 2018/0186125 A1* | 7/2018 | Mannheim Astete | . | G09B 19/24 |
| 2018/0257457 A1* | 9/2018 | Olson | | B62D 1/065 |
| 2020/0142232 A1* | 5/2020 | Demuth | | G02F 1/13781 |
| 2020/0159081 A1* | 5/2020 | Ahn | | G03B 21/62 |
| 2021/0123296 A1* | 4/2021 | Grigsby | | E06B 3/6722 |
| 2023/0004030 A1* | 1/2023 | Ma | | H02M 7/5387 |

* cited by examiner

MULTIPLE CIRCUIT VARIABLE LIGHT TRANSMISSION GLAZING SYSTEM

FIELD OF THE DISCLOSURE

The present disclosure relates to the field of laminated variable light transmission automotive glazing. More specifically, the present disclosure relates to an illuminated laminate without the drawbacks of the prior art which can also be manufactured with standard automotive glazing equipment, materials and processes.

BACKGROUND OF THE DISCLOSURE

To control the level of light transmission through a laminated glazing, there are many technologies available. These include but are not limited to electrochromic, photochromic, thermochromic and electric field sensitive films which are designed to be incorporated into laminated glass. Of particular interest and the subject of this disclosure are the two field sensitive technologies, Suspended Particle Device (SPD) films and Polymer Dispensed Liquid Crystal (PDLC) films. They can quickly change their light transmittance in response to an electrical field.

SPD is a variable tint technology with which the level of tint can be controlled and varied in response to an applied electrical field. SPD goes from dark in the off state to less dark in the on state. In an SPD film, microscopic droplets of liquid containing needle like particles, light vales, are suspended in a matrix. In the off state the particles are in a random state of alignment and block the transmission of light. The degree of alignment and resulting tint can be varied in response to the applied voltage. The light transmittance in the on and off states can also be shifted through changes to the thickness and composition of the active material. In the off state, it is still possible to see clearly through SPD.

SPD glazing is produced by adding a special film to a laminate. The typical construction of the film is comprised of the active material sandwiched between two thin plastic layers having a transparent conductive coating on each. The film is laminated in between two plastic bonding interlayer layers to form a laminated glazing.

PDLC is a light scattering technology which goes from opaque in the off state to clear in the on state. In a PDLC film, microscopic droplets of liquid crystal are suspended in a polymer matrix. In the off state the liquid crystals are in a random state of alignment and scatter the light providing privacy. In the off state, the film is substantially opaque. When an electric filed is applied, the crystals align and allow light to pass. The degree of scattering can be varied by varying the amplitude of the applied voltage. The level of light transmittance in the on and off states can also be shifted by making changes to the thickness and composition of the active material. PDLC is primarily a privacy product though it can also be used for solar control as it reduces the solar energy transmitted.

Laminates that incorporate these variable light transmittance technologies are sometimes referred to as "smart" glass or switchable. The typical automotive electrical system of today operates at 12 volts direct current. While it is likely that a higher voltage will be implemented at some point, it most likely will continue to be direct current and less than 50 volts, the maximum voltage considered as relatively safe for human contact.

Both SPD and PDLC require alternating current and a higher voltage. The minimum and maximum voltages, corresponding to minimum and maximum transparency depend upon the exact formulation, the conductivity of the electrodes, the separation distance between the electrodes and other factors. However, the typical minimum point at which the transition begins is in excess of the maximum 50 volts that may be available.

As a result, SPD and PDLC require a direct current to alternating current supply to operate.

In the off state, with no power applied, the film will be at its darkest or most opaque value. There is a certain minimum voltage that needs to be applied in before the film will start to change state. The film will remain in the dark/opaque state until this minimum voltage level is reached. There is also a maximum voltage at which the highest light transmission will occur. Exceeded this maximum value will not further change the light transmission.

As mentioned, the minimum and maximum values are dependent upon a number of variables including the type of film (SPD or PDLC), the formulation, the thickness of the emulsion, the substrate type and its thickness, the type of electrode, the electrode resistivity, the design of the bus bars feeding the electrodes and others.

The minimum voltage is generally around 50 volts and the maximum is generally around 100 volts for most of the films produced to date. Some newer formulations that have enhanced attributes including but not limited to a wider range of transmission, a wider operating temperature range, lower haze, a more neutral color and other attributes may require up to 200 volts.

With a household 120 VAC outlet, most SPD and PDLC films can be switched back and forth without changing the voltage. However, SPD and PDLC, will change in direct proportion to the voltage applied within its operating range. As an example, a film that starts to change at 50 volts and which reaches its maximum transmission at 100 volts will likely be at about at the center of its range at 75 volts. While many switchable smart windows do only operate in the on and off state, it is beneficial to be able to take full advantage of the capability of being able to set the transmission at any point within the operating range.

Unfortunately, the physics of the technology require a full sinewave voltage to operate. Thus, the typical inexpensive light dimmer, which clips the waveform, will not work. One method commonly used is the rheostat. As the real power and current are low, it is also possible to use a potentiometer. To change in a number of fixed steps a voltage divider network is used. A rheostat or potentiometer must be operated manually. A voltage divider network can be automated with relays or solid state switching.

For the most versatile and efficient automatic control, it is necessary to use a full sinewave voltage converter to modify the voltage.

The higher voltage required does present safety issues which must be addressed. As mentioned, touch potential must be taken into consideration. Human exposure to a voltage in excess of 50 volts can be dangerous. At the very least, a whole new and different set of safety regulations must be complied with.

The document U.S. Pat. No. 8,336,189 discloses a voltage divider circuit to limit touch exposure to less than 50 volts. The circuit uses a switching power supply circuit to step the DC voltage up and convert to alternating current. The voltage divider is connected to earth ground at a point on the circuit where the voltage differential between chassis ground and either side of the divider is 50 volts or less. The issue with this rather obvious solution is that some SPD and PDLC films require a voltage of more than 50 volts to reach their maximum transparency. While the voltage in can be increased beyond 100 volts, a touch potential of less than 50 volts is not maintained.

The document US 2019/0041668 addresses the touch potential issue by means of galvanic isolation provided by a step-up transformer. The direct current input to the primary of the transformer is switched on and over by a pulse width modulated control signal. The tap on the secondary is selected such that the touch potential is limited to the desired maximum and reference to earth ground. This has the drawback in that it can only operate a single switchable glazing and is also limited to a maximum output peak to peak of 100 volts.

BRIEF SUMMARY OF THE DISCLOSURE

The present disclosure solves the drawbacks of the prior art by providing a glazing system combining one or more switchable glazing circuits with a glazing controller. The glazing controller is operated by a microprocessor integrated circuit and comprises: a DC-to-DC flyback converter providing the maximum voltage. The DC-to-DC flyback converter is not typically used with most favoring the charge pump, switching power supply of other voltage boosting means. The flyback is a proven well understood technology having the advantage of full isolation of the output from the input as well as fewer and lower cost components and with the ability to achieve higher output voltage than many of the other methods in common use. The fixed high voltage DC output from the single flyback circuit in turn feeds a high voltage bus supplying DC voltage to one or more pulsed h-bridge circuit.

One H-bridge circuit is provided for each switchable output circuit. The h-bridges are switched by means of a pulse width modulated signal. The output of each h-bridge by means of an RC filter converts the variable square wave DC output into a waveform that is substantially a sinewave. By varying the duty cycle of the square wave, the sinewave amplitude can be controlled. The voltage and current at multiple points in the circuit are measured and monitored by the control module. In the even that an imbalance is detected, indicating a potential failure, the circuit is shut down. In this manner, sort circuits, open circuits and ground faults and other failure conditions can be detected. The control module can communicate with the vehicle by means of a serial port or by means of multiple analog and digital inputs and outputs.

By means of the control module, multiple types of film may be used on the same vehicle. Normally, a film that is very dark in the off state, which may be desirable for the roof and another that is very light in tint in the off state as may be required for positions other than the roof, would require different controllers as the operating range of the two types of films will not be the same. Likewise, it is an object of the present disclosure to operate glazings with SPD and PDLC in the same vehicle or even in the same glazing. By synthesizing the sine for each output, all can be operating over different ranges as required by the switchable glazing operating characteristics.

Advantages:
 Software configurable
 Small, lightweight, inexpensive
 Integrated Touch potential protection
 Ability to operate and supply higher voltages.
 Ability to control several switchable glazing circuits.
 Ability to control glazing with different operating characteristics.
 Ability to mix SPD and PDLC in the same vehicle.
 Ability to mix light and dark off state films in same vehicle.
 Ability to use SPD and PDLC in the same glazing.
 Ability to control multiple switchable circuits in the same glazing.
 Detection of ground faults, open circuits and short circuits
 On-board diagnostics

BRIEF DESCRIPTION OF THE SEVERAL VIEWS OF THE DRAWINGS

The above and other features, aspects, and advantages of the present invention are considered in more detail, in relation to the following description of embodiments thereof shown in the accompanying drawings, in which.

REFERENCE NUMERALS OF DRAWINGS

Figure 1:
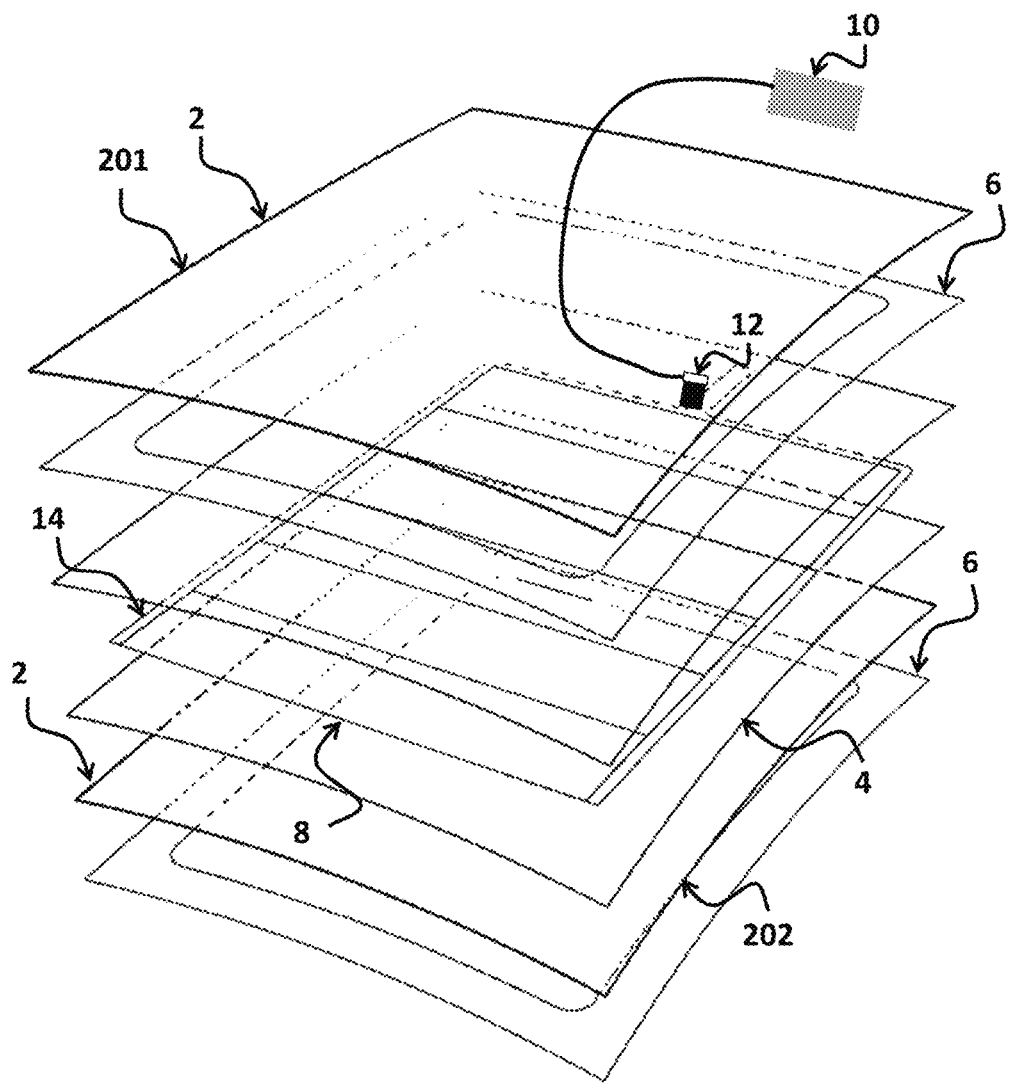
FIG. 1 shows an exploded view of a laminated roof with SPD film divided into six switchable circuits.

2 Glass
4 Plastic bonding interlayer
6 Black Frit
8 Switchable Film
10 Control module
12 Connector
14 Flexible circuit
16 LASER cut in switchable film
201 Glass layer facing the exterior of the vehicle
202 Glass layer facing the interior of the vehicle

DETAILED DESCRIPTION OF THE DISCLOSURE

The following terminology is used to describe the laminated glazing of the present disclosure.

Glazing, in the context of this document shall mean any safety glazing certified to any of the regulatory standards for automotive safety glazing.

The term "glass" can be applied to many inorganic materials, including many that are not transparent. For this document we will only be referring to transparent glass. From a scientific standpoint, glass is defined as a state of matter comprising a non-crystalline amorphous solid that lacks the ordered molecular structure of true solids. Glasses have the mechanical rigidity of crystals with the random structure of liquids.

Glass is formed by mixing various substances together and then heating to a temperature where they melt and fully dissolve in each other, forming a miscible homogeneous fluid.

Most of the worlds' flat glass is produced by the float glass process, first commercialized in the 1950s. In the float glass process, the raw ingredients are melted in a large refractory vessel and then the molten glass is extruded from the vessel onto a bath of molten tin where the glass floats.

The types of glass that may be used include but are not limited to the common soda-lime variety typical of automotive glazing as well as aluminosilicate, lithium aluminosilicate, borosilicate, glass ceramics, and the various other inorganic solid amorphous compositions which undergo a glass transition and are classified as glass including those that are not transparent. The glass layers may be comprised of heat absorbing glass compositions as well as infrared reflecting and other types of coatings. Laminates, in general, are articles comprised of multiple sheets of thin, relative to their length and width, material, with each thin sheet having two oppositely disposed major faces and typically of relatively uniform thickness, which are permanently bonded to one and other across at least one major face of each sheet.

Laminated safety glass is made by bonding two sheets (201 & 202) of annealed glass together using a plastic bonding layer comprised of a thin sheet of transparent thermo plastic (plastic bonding interlayer) 4 as shown in FIG. 1.

Annealed glass is glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. The plastic layer 4 also helps to prevent penetration by objects striking the laminate from the exterior and in the event of a crash occupant retention is improved.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment.

Heat strengthened, full temper soda-lime float glass, with a compressive strength in the range of at least 70 M Pa, can be used in all vehicle positions other than the windshield. Heat strengthened (tempered) glass has a layer of high compression on the outside surfaces of the glass, balanced by tension on the inside of the glass which is produced by the rapid cooling of the hot softened glass. When tempered glass breaks, the tension and compression are no longer in balance and the glass breaks into small beads with dull edges. Tempered glass is much stronger than annealed laminated glass. The thickness limits of the typical automotive heat strengthening process are in the 3.2 mm to 3.6 mm range. This is due to the rapid heat transfer that is required. It is not possible to achieve the high surface compression needed with thinner glass using the typical blower type low pressure air quenching systems.

A wide range of coatings, used to enhance the performance and properties of glass, are available and in common use. These include but are not limited to anti-reflective, infrared reflecting, hydrophobic, hydrophilic, self-healing, self-cleaning, anti-bacterial, anti-scratch, anti-graffiti, anti-fingerprint, and anti-glare.

Methods of application include Magnetron Sputtered Vacuum Deposition (MSVD) as well as others known in the art that are applied via pyrolytic, spray, Controlled Vapor Deposition (CVD), dip, sol-gel, and other methods.

The glass layers are formed using gravity bending, press bending, cold bending or any other conventional means known in the art. In the gravity bending process, the glass flat is supported near the edge of glass and then heated. The hot glass sags to the desired shape under the force of gravity. With press bending, the flat glass is heated and then bent on a full of partial surface mold. Air pressure and vacuum are often used to assist the bending process. Gravity and press bending methods for forming glass are well known in the art and will not be discussed in detail in the present disclosure.

The plastic bonding layer 4 (interlayer) has the primary function of bonding the major faces of adjacent layers to each other. The material selected is typically a clear thermoset plastic.

For automotive use, the most commonly used plastic bonding layer 4 (interlayer) is polyvinyl butyral (PVB). PVB has excellent adhesion to glass and is optically clear once laminated. It is produced by the reaction between polyvinyl alcohol and n-butyraldehyde. PVB is clear and has high adhesion to glass. However, PVB by itself, it is too brittle. Plasticizers must be added to make the material flexible and to give it the ability to dissipate energy over a wide range over the temperature range required for an automobile. Only a small number of plasticizers are used. They are typically linear dicarboxylic esters. Two in common use are di-n-hexyl adipate and tetra-ethylene glycol di-n-heptanoate. A typical automotive PVB interlayer is comprised of 30-40% plasticizer by weight.

In addition to polyvinyl butyl, ionoplast polymers, Ethylene Vinyl Acetate (EVA), Cast in Place (CIP) liquid resin and thermoplastic polyurethane (TPU) can also be used. Automotive interlayers are made by an extrusion process with has a thickness tolerance and process variation. As a smooth surface tends to stick to the glass, making it difficult to position on the glass and to trap air, to facilitate the handling of the plastic sheet and the removal or air (deairing) from the laminate, the surface of the plastic is normally embossed contributing additional variation to the sheet. Standard thicknesses for automotive PVB interlayer at 0.38 mm and 0.76 mm (15 and 30 mil).

Interlayers are available with enhanced capabilities beyond bonding the glass layers together. The present disclosure may include interlayers designed to dampen sound. Such interlayers are comprised whole or in part of a layer of plastic that is softer and more flexible than that normally used. The interlayer may also be of a type which has solar attenuating properties.

A wide variety of films are available that can be incorporated into a laminate. The uses for these films include but are not limited to solar control, variable light transmission, increased stiffness, increased structural integrity, improved penetration resistance, improved occupant retention, providing a barrier, tint, providing a sunshade, color correction, and as a substrate for functional and aesthetic graphics. The term "film" shall include these as well as other products that may be developed or which are currently available which enhance the performance, function, aesthetics or cost of a laminated glazing. Most films do not have adhesive properties. To incorporate into a laminate, sheets of plastic interlayer are needed on each side of the film to bond the film to the other layers of the laminate.

Automotive glazing often makes use of heat absorbing glass compositions to reduce the solar load on the vehicle. While a heat absorbing window can be very effective the glass will heat up and transfer energy to the passenger compartment through convective transfer and radiation. A more efficient method is to reflect the heat back to the atmosphere allowing the glass to stay cooler. This is done using various infrared reflecting films and coatings. Infrared coatings and films are generally too soft to be mounted or applied to a glass surface exposed to the elements. Instead, they must be fabricated as one of the internal layers of a laminated product to prevent damage and degradation of the film or coating.

One of the big advantages of a laminated window over a tempered monolithic glazing is that a laminate can make use of infrared reflecting coatings and films in addition to heat absorbing compositions and interlayers.

Infrared reflecting coatings include but are not limited to the various metal/dielectric layered coatings.

Infrared reflecting films include both metallic coated plastic substrates as well as organic based non-metallic optical films which reflect in the infrared. Most of the infrared reflecting films are comprised of a plastic film substrate having an infrared reflecting layered metallic coating applied.

The glazing of the disclosure may comprise any combination of coatings, interlayers, films, glass compositions and treatments as described.

While the focus of the disclosure and embodiments is on panoramic roof glazings, the present disclosure may be implemented in any of the other glazing position of the vehicle.

The switchable laminate of the disclosure comprises two glass layers bonded together by two plastic interlayer layers with a switchable film sandwiched between the two plastic interlayer layers. The switchable film may be partitioned electrically into separately switchable circuits. The switchable film itself may be cut or the electrode layer may be cut by means of a LASER. The control voltage is applied to each circuit by means of a flexible circuit within the laminate. The flexible circuit exits the edge of the laminate at least one point where it is then connected directly or indirectly by means of the vehicle harness to the controller.

Figure 3:
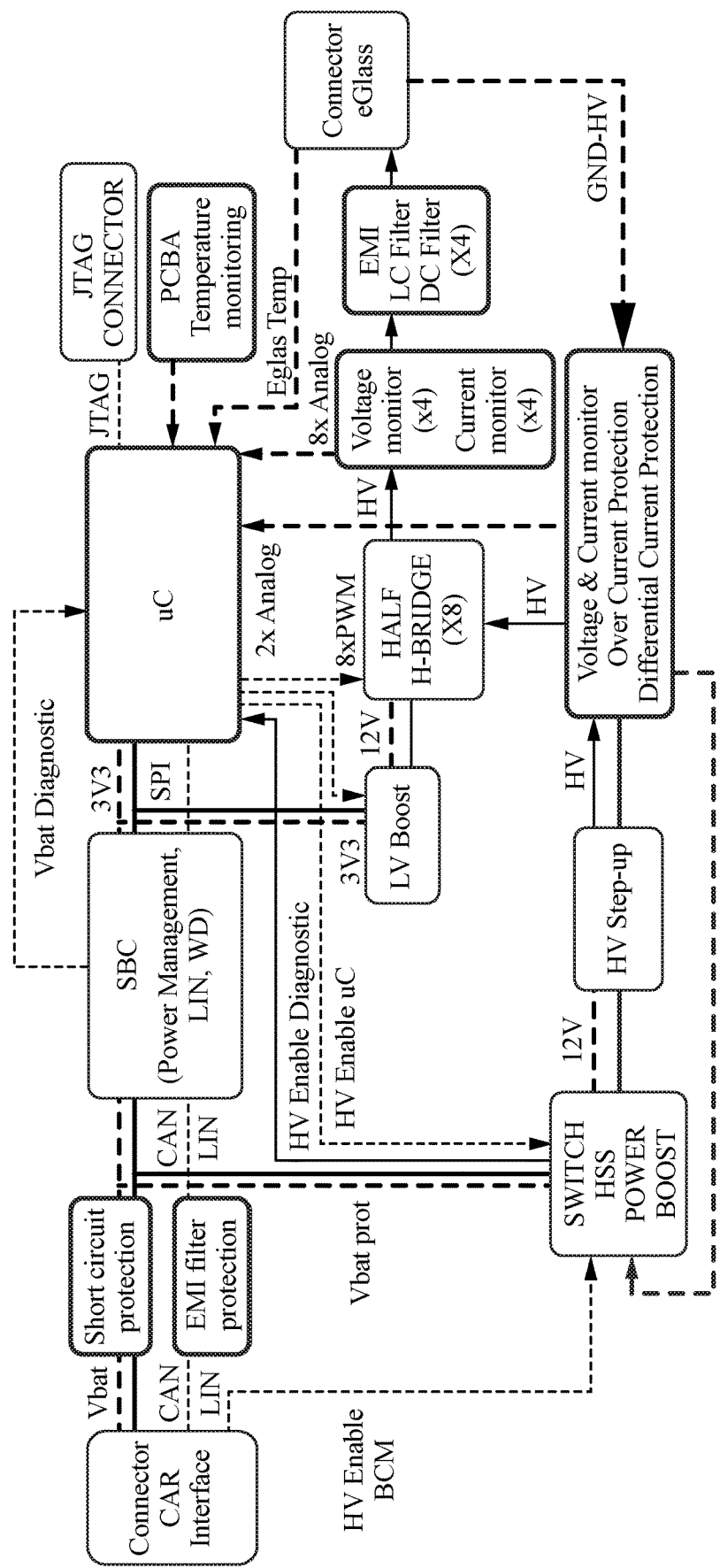
FIG. 3 shows a controller system architecture diagram.

The functioning of the controller is illustrated in FIG. 3. The following configuration is used in the embodiments of the disclosure.

The control module is based upon a multicore high capability micro controller with a high number of analog and digital inputs. The control module interfaces to the vehicle by means of a serial CAN interface integrated into the microcontroller.

The vehicle power is input to the controller by means of a multi pin watertight locking connector. The same connector is also used to connect the outputs to the switchable circuits. The current passes through a circuit that protects from short circuits and an EMI filter and a reverse polarity protection circuit.

Before the module switches on any of the output, the micro-controller checks that there are no faults and that the vehicle battery voltage is sufficient along with other conditions monitored and communicated over the CAN bus by the vehicle. If all conditions are met, the high voltage flyback converter is enabled.

The vehicle voltage is stepped up from 12 volts nominal to 350 volts DC. The high voltage DC is distributed to multiple (4) circuits that use an H-bridge to chop the high voltage DC outputting a square wave with variable pulse width to an RC filter. The effect of the filter is to store and discharge energy such that the square wave is converter into a form that is substantially a sine wave. By varying the square wave pulse width, the magnitude of the sinewave can be changed. The sinewave has a fixed frequency of 400 Hz.

The high voltage is isolated from the vehicle electrical system but may be tied to chassis ground if desired. If tied at the center point, touch potential is further lowered by half. From the standpoint of the switchable film, all that matters is the peak to peak amplitude.

Each output is filter for EMI.

The voltage and current of each of the outputs from the flyback converter and each sine switchable circuit output are continually monitored. The module will shut down if an imbalance is detected.

DESCRIPTION OF EMBODIMENTS

Figure 2:
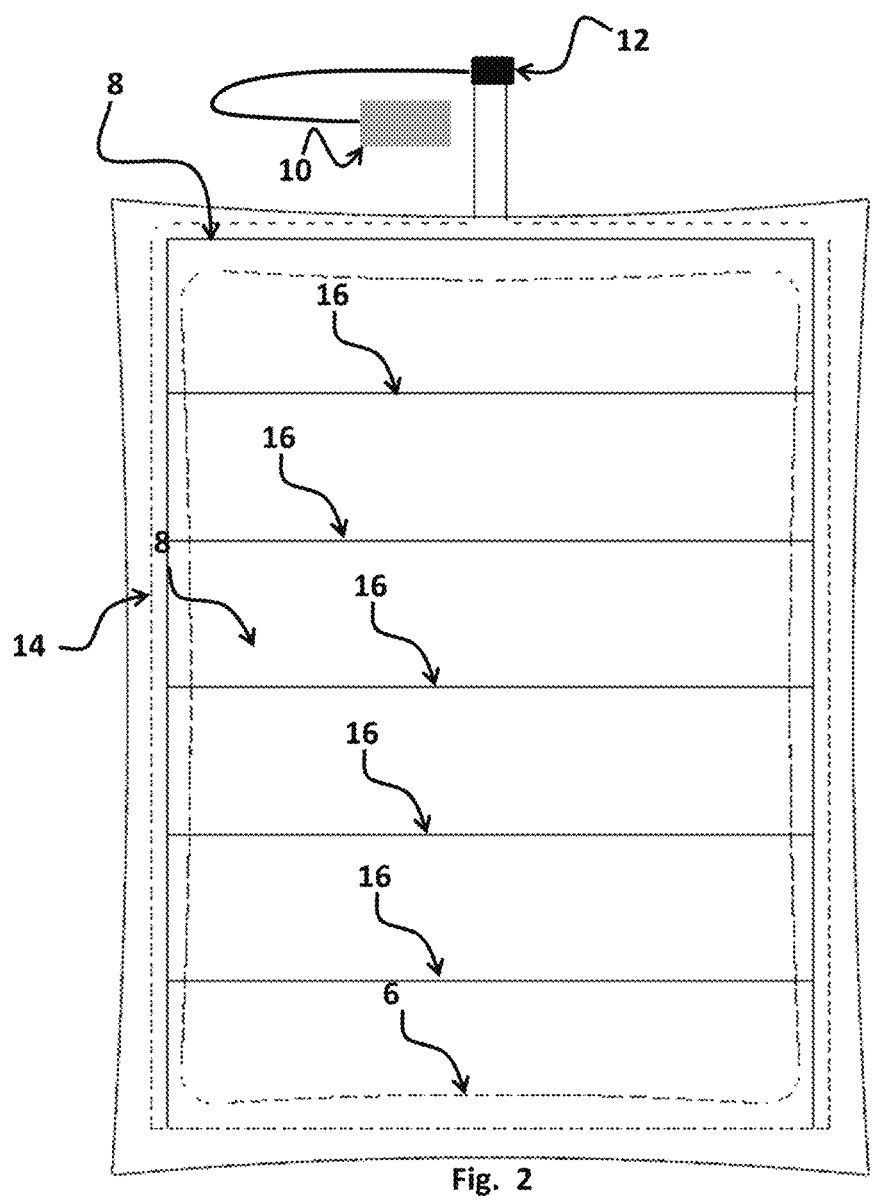
FIG. 2. Shows a top view of FIG. 1.

An embodiment of the system is illustrated in FIGS. 1 and 2. A large laminated panoramic roof measuring 1.2 meters by 0.75 meters is shown. The roof is comprised of a clear soda-lime outer glass layer 201 laminated to a dark solar green soda-lime inner glass layer 202. Two layers of 0.76 mm thick PVB interlayer are used to sandwich a sheet of 0.4 mm thick SPD film having an off state visible light transmission of 50% and an on-state transmission of 80% and has a grey tint. The operating range of the SPD film ranges from 80 volts to 140 volts. The electrode layer of the SPD film is cut by means of an UV laser through the plastic substrate to form six separately switchable circuits. The circuits are connected to the control signals by means of a flexible circuit which exits the laminate at the center of the rear edge of the glass. The connector connects to the control module via the vehicle wiring harness. The control module is mounted in the headline.

The control module 12 is powered by the 12-volt nominal vehicle electrical system. Commands are sent to the module over the vehicle car bus. The vehicle is equipped with a multifunction touch screen. A screen is configured with touch sliders that allow the operator to change the transmission of any or all of the separate circuits. The vehicle may also automatically adjust the transmission in response to the environmental variable such as inside/outside temperature, speed, light intensity, and other factors. Potential errors in the software or hardware are also protected by means of a watchdog timer which must be reset by the CPU every 100 ms.

It must be understood that the present disclosure is not limited to the embodiments described and illustrated, as it will be obvious for an expert on the art, there are different variations and possible modifications that do not strive away from the disclosure's essence, which is only defined by the following claims.

What is claimed is:

1. An automotive glazing roof with variable light transmission system, comprising:
    at least one laminate having:
    at least two glass layers;
    at least one plastic interlayer between the at least two glass layers;
    at least one variable light transmission film that varies the light transmission in response to a control signal, wherein the at least one variable light transmission film is electrically connected and partitioned to form at least one independent circuit;
    a control module that provides a control signal to each at least one variable light transmission film circuit; and
    wherein the control module converts a DC voltage to the voltage of the at least one variable light transmission film with a single flyback converter;
    wherein the flyback converter is a DC-to-DC flyback converter controlled by a micro-controller;
    wherein the micro-controller generates pulse width modulating output signals distributed to at least one H-bridge circuit which delivers an output signal;
    wherein the output signal of the H-bridge circuit is alternating current (AC) and is substantially a sine wave; and
    wherein the sine wave amplitude is controlled by varying the duty cycle of the pulse width modulating output signals of the micro-controller.

2. The automotive glazing roof with variable light transmission system of claim 1, wherein the at least one variable light transmission film is a Suspended Particle Device (SPD) film.

3. The automotive glazing roof with variable light transmission system of claim 1, wherein the at least one variable light transmission film is a Polymer Dispensed Liquid Crystal (PDLC) film.

4. The automotive glazing roof with variable light transmission system of claim 1, wherein the at least one variable light transmission film comprises a SPD film and a PDLC film.

5. The automotive glazing roof with variable light transmission system of claim 1, wherein the control module responds to commands sent on a serial communication bus.

6. The automotive glazing roof with variable light transmission system of claim 1, wherein the control module monitors and detects electrical faults.

7. The automotive glazing roof with variable light transmission system of claim 1, wherein the control module comprises a communication module that enables the communication of the micro-controller.

8. The automotive glazing roof with variable light transmission glazing system of claim 1, wherein the control module independently controls the light transmission of each of the at least one variable light transmission film.

9. A vehicle comprising the automotive glazing roof with variable light transmission system of claim 1.

\* \* \* \* \*